US009475068B2

(12) United States Patent
Moberg et al.

(10) Patent No.: US 9,475,068 B2
(45) Date of Patent: Oct. 25, 2016

(54) SMOOTHLY ACCELERATING CHANNEL INLET FOR CENTRIFUGAL SEPARATOR

(71) Applicant: ALFA LAVAL CORPORATE AB, Lund (SE)

(72) Inventors: Hans Moberg, Stockholm (SE); Tomas Oldebäck, Vendelsö (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 14/648,393

(22) PCT Filed: Feb. 11, 2014

(86) PCT No.: PCT/EP2014/052613
§ 371 (c)(1),
(2) Date: May 29, 2015

(87) PCT Pub. No.: WO2014/124926
PCT Pub. Date: Aug. 21, 2014

(65) Prior Publication Data
US 2015/0314306 A1 Nov. 5, 2015

(30) Foreign Application Priority Data
Feb. 15, 2013 (EP) ..................................... 13155447

(51) Int. Cl.
*B04B 11/06* (2006.01)
*B04B 1/20* (2006.01)
(Continued)

(52) U.S. Cl.
CPC ............... *B04B 1/20* (2013.01); *B01D 21/262* (2013.01); *B04B 11/02* (2013.01); *B04B 11/06* (2013.01); *B04B 2001/2033* (2013.01); *B04B 2001/2066* (2013.01)

(58) Field of Classification Search
CPC .............. B04B 2001/2033; B04B 2001/2066; B04B 11/06
USPC ....... 366/52–54, 56, 84, 60; 210/377, 380.1, 210/380.3
See application file for complete search history.

(56) References Cited

U.S. PATENT DOCUMENTS 1,590,584 A   6/1926 Logan
1,906,457 A   5/1933 Flowers
(Continued)

FOREIGN PATENT DOCUMENTS

CN   201223828 Y   4/2009
FR   1.070.212 A   7/1954
(Continued)

Primary Examiner — Charles Cooley
(74) Attorney, Agent, or Firm — Birch, Stewart, Kolasch & Birch, LLP

(57) ABSTRACT

An inlet device for a centrifugal separator for directing the liquid mixture that is to be separated from an inlet pipe to a separation chamber is rotatable around a central rotational axis. The inlet device includes a central conical receiving structure arranged around the axis and including a central receiving zone for receiving the liquid mixture from the inlet pipe and wherein the zone surrounds the apex of the conical receiving structure. The inlet device further includes at least one inlet channel for directing the liquid from the receiving zone to the separation chamber, wherein the channel extends from the periphery of the receiving zone and spirals down the outer surface of the conical receiving structure. Further, the at least one inlet channel extends from the receiving zone in a direction that forms an angle α with the tangent of the periphery of the receiving zone and α is less than 90°. Further, the at least one inlet channel extends in a straight radial direction from central rotational axis from the bottom of the central conical receiving structure to an inlet channel outlet, wherein said outlet is configured to be in contact with the separation chamber of said centrifugal separator.

20 Claims, 4 Drawing Sheets

(51) Int. Cl.
  *B01D 21/26* (2006.01)
  *B04B 11/02* (2006.01)

(56) References Cited

U.S. PATENT DOCUMENTS

| | | | | |
|---|---|---|---|---|
| 3,228,592 A | * | 1/1966 | Shapiro | B04B 1/20 494/51 |
| 3,428,246 A | * | 2/1969 | Finkelston | B04B 1/20 210/374 |
| 3,795,361 A | * | 3/1974 | Lee | B04B 1/20 494/26 |
| 4,245,777 A | * | 1/1981 | Lavanchy | B04B 1/20 494/43 |
| 4,334,647 A | * | 6/1982 | Taylor | B04B 1/20 494/37 |
| 4,701,158 A | | 10/1987 | Inge et al. | |
| 5,024,648 A | | 6/1991 | Inge et al. | |
| 5,364,335 A | * | 11/1994 | Franzen | B04B 1/20 494/15 |
| 5,374,234 A | * | 12/1994 | Madsen | B04B 1/20 494/53 |
| 5,380,266 A | * | 1/1995 | Leung | B04B 1/20 494/53 |
| 5,921,909 A | | 7/1999 | Gustafsson | |
| 6,605,029 B1 | * | 8/2003 | Koch | B04B 1/20 494/53 |
| 7,207,504 B2 | | 4/2007 | Willmot | |
| 8,790,233 B2 | | 7/2014 | Ridderstrale et al. | |
| 9,266,122 B2 | * | 2/2016 | Kjær | B04B 1/20 |
| 9,333,515 B2 | * | 5/2016 | Reiff | B04B 1/20 |
| 2002/0132718 A1 | * | 9/2002 | Koch | B04B 1/20 494/53 |
| 2003/0032541 A1 | * | 2/2003 | Stroucken | B04B 1/20 494/53 |
| 2003/0096691 A1 | * | 5/2003 | Koch | B04B 1/20 494/53 |
| 2003/0228966 A1 | * | 12/2003 | Koch | B04B 1/20 494/53 |
| 2015/0314306 A1 | * | 11/2015 | Moberg | B04B 1/20 494/68 |

FOREIGN PATENT DOCUMENTS

| | | |
|---|---|---|
| GB | 496.998 A | 12/1938 |
| JP | 2597697 B2 | 4/1997 |
| KR | 10-2010-0029756 A | 3/2010 |
| WO | WO 2012/102627 A1 | 8/2012 |

\* cited by examiner

SMOOTHLY ACCELERATING CHANNEL INLET FOR CENTRIFUGAL SEPARATOR

FIELD OF THE INVENTION

The present invention relates to the field of centrifugal separators, such as centrifugal separators for separating solid particles from a liquid mixture. More specifically, the present invention relates to an inlet device for such a centrifugal separator.

BACKGROUND OF THE INVENTION

Centrifugal separators are generally used for separation of liquids and/or for separation of solids from a liquid. During operation, heavy particles or denser liquid, usually water, accumulates at the periphery of a rotating container whereas less dense liquid accumulates closer to the central axis of rotation. This allows for collection of the separated fraction, e.g. by means of different collection means arranged at the periphery and close to the rotational axis, respectively.

The liquid mixture that is to be separated is usually supplied by an inlet pipe, which may be arranged close to the central rotational axis, and is then guided e.g. via inlet channels to the separation chamber, i.e. to the part of the centrifugal separator in which the actual separation occurs. However, turbulence may occur when liquid is transferred from the inlet pipe to the separation chamber, which in turn may affect the separating performance in a negative way. For example, turbulence may cause disruption of droplets, particles or agglomerates of particles in the liquid mixture, which may make separation of e.g. oil and water more difficult.

U.S. Pat. No. 5,921,909 discloses a specific inlet device for a centrifugal separator. The inlet device is easily modified such that the flow capacity may be adjusted without the number of expensive details being increased. The inlet device comprises a zone which is essentially obstacle-free for the liquid to be separated during operation.

However, there is still la need in the art for means of decreasing the risk of turbulence in the liquid that is to be separated.

SUMMARY OF THE INVENTION

It is an object of the invention to at least partly overcome one or more of the above-identified limitations of the prior art. In particular, it is an object to decrease the turbulence at the inlet of a centrifugal separator.

As a first aspect of the invention, there is provided an inlet device for a centrifugal separator for directing the liquid mixture that is to be separated from an inlet pipe to a separation chamber, wherein the inlet device is rotatable around central rotational axis R and comprises a central conical receiving structure arranged around the axis R and comprising a central receiving zone for receiving the liquid mixture from the inlet pipe and wherein the zone surrounds the apex of the conical receiving structure;

at least one inlet channel for directing the liquid mixture from the receiving zone to the separation chamber, wherein the channel extends from the periphery of the receiving zone and spirals down the outer surface of the conical receiving structure; and wherein the at least one inlet channel extends from the receiving zone in a direction that forms an angle a with the tangent of the periphery of the receiving zone and wherein a is less than 90°, and wherein said at least one inlet channel further extends in a straight radial direction from central rotational axis R from the bottom of the central conical receiving structure to an inlet channel outlet, wherein said outlet is configured to be in contact with the separation chamber of said centrifugal separator.

The first aspect of the invention is based on the insight that the actual inlet of a centrifugal separator is a place where turbulence may occur, and that an inlet according to the first aspect of the invention at least reduces the risk for turbulence to occur. An inlet device of the present disclosure thus provides for smoothly accelerating the liquid mixture that is to be separated in the centrifugal separator. The inlet device may thus be a distributor for a liquid mixture that is to be separated.

The inlet device of the present disclosure is arranged for directing liquid from the inlet pipe to the separation chamber of a centrifugal separator. The centrifugal separator may be a high speed centrifugal separator, such as a separator arranged to operate at a rotational speed of 1000-9000 rpm, such as between 5000-8000 rpm, such as about 7500 rpm. The inlet pipe may be arranged along rotational axis R and the inlet device may be arranged opposite the end of the inlet pipe, such as below or above the inlet pipe and centred around R. The rotational axis R may for example be a vertical rotational axis when the separator and/or the inlet device are in use.

Liquid that is to be separated is thus intended to be directed from the inlet pipe, via the central receiving zone of the conical receiving structure and through the inlet channel or channels to the separation chamber of the separator. In other words, the inlet device provides for a convenient means for both changing the direction of the liquid mixture, from e.g. a direction along R to a direction that is substantially perpendicular to R, and at the same time gently accelerating the liquid.

The inlet device comprises a central conical receiving structure having at least one inlet channel that spirals down the outer sides of the conical structure. The inlet channel or channels twist all the way down to the bottom of the conical receiving structure. Thus, the inlet channel or channels are twisted and/or may form the beginning of an S-shaped structure. The channel may spiral less than a complete or full turn around the conical structure. As an example, the at least one inlet channel may spiral less than half a full turn around the conical structure, such as about a quarter of a turn around the conical structure. A twisted inlet channel is advantageous e.g. when the inlet pipe of the separator is stationary and the inlet device rotates, i.e. it aids in accelerating the liquid gently.

The use of at least one inlet channel is advantageous in that it gives the inlet device a high efficiency. As an example, the inlet device may comprise at least two inlet channels, such as three, four, five or six, inlet channels. The inlet device may comprise at least six inlet channels, such as at least ten inlet channels, depending on the size of the separator in which the inlet device is to be used.

Furthermore, an inlet device according to the first aspect of the invention may be advantageous in applications in which a low flow of liquid that is to be separated is used. For example, the inlet flow may be about 100-2000 liter/hour, such as about 150-750 liter/hour, such as about 200-500 liter/hour.

The inlet device further provides for a machine part of rather small size. If placed e.g. in a centrifugal separator, it does not require much space but may still be efficient in directing liquid from the inlet to the separation chamber.

The whole inlet device or parts of the inlet device may comprise or be composed of a plastic such as PEEK (polyether ether ketone) which has high wear resistance and little change of size when the temperature change. However, also less exclusive material may be used.

The angle $\alpha$ refers to the angle between the extension of an inlet channel from the receiving zone and a tangent of the periphery of the central receiving zone when viewed in a direction along R, e.g. when viewing the central conical receiving structure from above. In other words, $\alpha$ may also be defined as the angle between the extension of an inlet channel from the receiving zone and a tangent of the periphery of the central receiving zone when projected onto a plane orthogonal to R. Since the inlet channel does not extend in a straight direction, the direction at which the inlet channel extends is the direction of a tangent to the inlet channel extension at the "start" of the inlet channel, i.e. at the periphery of the receiving zone.

The inventors have found that if the angle $\alpha$ is less than 90°, it aids in achieving a smooth acceleration of the liquid.

Furthermore, the at least one inlet channel further extends radially, i.e in a straight radial direction, from rotational axis R from the bottom of the central conical receiving structure to an inlet channel outlet, wherein the outlet is configured to be in contact with the separation chamber of the centrifugal separator. This is advantageous in that it may give the liquid a smooth acceleration when entering the separation chamber. The bottom of the central conical receiving structure is thus the base of the cone-structure of the central conical receiving structure.

Consequently, when reaching the bottom of the conical receiving structure, the inlet channel may extend in a straight direction to an inlet channel outlet. In other words, the inlet channel may be composed of two parts, one that twists down the sides of the conical receiving structure and one that extends in a straight radial direction from the bottom of the conical structure to the outlet, which is arranged to be in contact with the separation chamber.

In embodiments of the first aspect of the invention, a is less than 45°. Furthermore, $\alpha$ may be between 15° and 45°, such as about 30°. It may be preferable to have $\alpha$ as small as possible, but it in practice it may depend on the manufacturing principles.

In embodiments of the first aspect of the invention, the apex of the central conical receiving structure is rounded.

A rounded apex or top of the conical structure further provides for a smooth acceleration and less turbulence of the liquid that is to be separated.

In embodiments of the first aspect of the invention, the at least one inlet channel spirals clockwise from the central receiving zone down the outer surface of the conical receiving structure if the inlet device is for rotation in an anti-clockwise direction around rotational axis R and vice versa.

Consequently, if the inlet device is for rotation in a clockwise direction, the at least one inlet channel may spiral in an anti-clockwise direction from the receiving zone to the bottom of the conical receiving structure.

The terms "clockwise" and "anti-clockwise" refers to the spiral direction when the central conical receiving is viewed from the top (or apex) and starting from the apex and continuing down the outer sides to the bottom of the conical receiving structure.

In embodiments of the first aspect of the invention, said device has a substantially circular cross section and wherein said inlet channel is located at the outlet in a direction that is substantially perpendicular to the tangent of said periphery of said circular cross section.

The circular cross section may thus be a cross section that is perpendicular to rotational axis R. A circular cross section may be advantageous since the inlet device is rotatable, i.e. it gives the device a rotational symmetry. Having the inlet channel or channels leaving the outlet in a direction that is substantially perpendicular to the tangent of the circular periphery of the inlet device is advantageous in that it gives the liquid a preferable acceleration when entering the separation chamber.

As an example, the inlet device may have bowl-like shape in which the central conical receiving structure is located in the centre within the bowl-like shape and extending from the bottom of the bowl-like shape, and wherein the at least one inlet channel extend radially from the bottom of the conical receiving structure and up the inner sides of the bowl-like structure.

For example, the inlet channel outlet may be arranged at a position that is vertically above the apex of the central conical receiving structure along rotational axis R.

Thus, if R is a vertical rotational axis, the outlet may be located vertically above the apex of the conical receiving structure.

This is advantageous in that it allows the separation chamber of the centrifugal separator to be located at a position above the conical receiving structure, if the rotational axis R extends in the vertical direction. This may be useful since it provides for a centrifugal separator having a compact design.

In embodiments of the first aspect of the invention, the width of the at least one inlet channel is substantially constant throughout the length of the at least one inlet channel.

Having an inlet channel with a constant width is advantageous in that it facilitates transport of liquid without giving the liquid any further acceleration or braking. If for example the liquid mixture that is to be separated comprises oil drops, breaking or disruption of such drops is avoided to a large extent if the inlet channels have a constant width. In other words, a constant width prevents the inlet device working as a mixer or beater that disrupts oil drops that are to be separated.

As a second aspect of the invention, there is provided a centrifugal separator for separating solids from a liquid mixture; comprising a rotor body which is rotatable around a central axis of rotation (R) and comprising a separation chamber, an inlet pipe for supplying liquid mixture that is to be separated;

at least one liquid outlet for discharge of separated liquid from the liquid mixture;

at least one sludge outlet for the separated solids, a screw conveyor adapted to rotate in the rotor body around the axis of rotation (R), for transporting the separated solids in the separation chamber towards and out of the sludge outlet; and an inlet device according to the first aspect of the invention above and centred around rotational axis R and for directing supplied liquid mixture from the inlet pipe to the separation chamber.

A centrifugal separator according to the second aspect is advantageous in that the inlet provides for a smooth acceleration of the liquid mixture. Furthermore, the inlet device provides for dimensioning the centrifugal separator such that it has a compact design.

The inlet device may be arranged opposite the end of the inlet pipe, such as below the end of the inlet pipe if the separator is fed from the top or below the end of the inlet pipe if the separator is fed from the bottom. In other words, the inlet device is arraigned such that the central conical central conical receiving structure faces the end of the inlet pipe, such that liquid mixture may be discharged from the inlet pipe to the inlet device.

Further, the diameter of the central conical receiving structure may be about the same as the diameter of the inlet pipe.

The centrifugal separator may be regarded as a so-called decanter centrifuge, i.e. a centrifuge with a screw conveyor (sludge conveyor) for transporting separated solids along the surrounding wall of the rotor to a sludge outlet.

The centrifugal separator may be a high speed centrifugal separator, adapted to operate at a rotational speed of about of 1000-9000 rpm, such as between 5000-8000 rpm, such as about 7500 rpm. The solids may comprise solid particles. The liquid mixture may further comprise an aqueous phase and/or an oil phase. The oil phase may comprise lubricating oil that has been used as lubricant in a diesel engine and have been contaminated there by solid particles dispersed in the oil. The oil may also comprise, for example, hydraulic oil, cylinder oil, cutting oil, rolling oil, hardening oil and/or mineral oil.

The inlet pipe may be a stationary inlet pipe and/or be centred around rotational axis R.

Furthermore, the screw conveyor may be adapted to rotate at a speed differing from the rotational speed of the rotor body.

In an embodiment of the second aspect of the invention, the inlet device is configured to rotate with the rotor body. Consequently, this would mean that the inlet device rotates at the same speed as the rotor body and separation chamber.

In an embodiment of the second aspect of the invention, the rotor body is rotatably supported only at its one end through a rotor shaft, which is arranged so that the axis of rotation (R) extends substantially vertically.

The end that is supported by a rotor shaft may for example be the upper end. Consequently, the rotor may be supported only at one of its ends.

In embodiments of the second aspect of the invention, the rotor body includes a stack of truncated conical separation discs in the separation chamber.

This is advantageous in that it provides for an efficient separation of the liquid mixture. The separation discs may be mounted for rotation together with the rotor body.

For example, the separation chamber may include several separation discs, which between themselves form separation spaces having small radial distances between adjacent separation discs that are mounted for rotation with the rotor. Further, the separation discs may be conical, stacked upon each other and placed coaxially with the rotor. Moreover, the conical separation discs may each define a base end that is turned toward one end of the rotor, such as the lower end if the rotor body is supported at its upper end.

In embodiments of the second aspect of the invention, the inlet pipe extends into the rotor body at a first end of the rotor body, the liquid outlet includes at least one outlet channel, which extends out of the rotor body at the first end, and the sludge outlet for separated solids is arranged at the end opposite the first end of the rotor body.

Such a configuration allows sludge to be deposited from the opposite side of the rotor body compared to the inlet and liquid outlets, which give the configuration a practical advantage.

Consequently, the rotor may be supported in a way such that a rotor shaft is situated at the upper end of the rotor and the sludge outlet is situated at the lower end of the rotor when rotational axis R is substantially vertical. This is advantageous in that it gives the separator great flexibility since the sludge outlet, which is provided at a free end (i.e. no support) of the rotor, can easily be changed and thereby adapted to the amount of sludge in the liquid mixture which is to be treated in the centrifugal separator. It can for example be adapted (in length, size and inclination) to discharge a relatively large amount of sludge, if there's a risk that the solids could accumulate inside the rotor during operation and clog (or obstruct) the separation spaces between the separation discs. The centrifugal separator may conversely be adapted for discharge a small amount of sludge when there's less sludge in the liquid mixture.

Furthermore, the lower part of the rotor may include a conical portion. Such a conical portion of the rotor may be frustoconical and at its narrow end may define an axially directed central opening. If the rotor body is supported in the upper end, this central opening may be arranged at the lower part of the rotor. The sludge outlet of the rotor may be formed by this central opening.

In embodiments of the second aspect of the invention, the sludge outlet is arranged close to rotational axis R. For example, the sludge outlet may be centered around rotational axis R.

By placing the sludge outlet of the rotor very close to the rotational axis, a free liquid surface formed within the rotor during operation can be kept close to the rotational axis of the rotor. It's thereby possible to insert separation discs of small dimensions which are less expensive to manufacture than large-sized separation discs (having a greater diameter) which must be manufactured in higher strength materials to withstand higher strains and retain their shape during operation.

In embodiments of the second aspect of the invention, at least one liquid outlet for discharge of separated liquid from the liquid mixture comprises an outlet for a liquid of a first density and an outlet for a liquid of a density that is higher than the first density.

Consequently, the separator may comprise an outlet for discharging water and a separate outlet for discharging oil during rotation of the rotor body.

BRIEF DESCRIPTION OF THE DRAWINGS

The invention will be further explained by a description of an embodiment in the following with reference to the accompanying drawings.

FIG. 1b shows a close up view of the central part of the inlet device of FIG. 1a.

FIG. 2 shows a perspective view of the inlet device of FIG. 1a.

FIG. 3 shows a sectional view of the inlet device of FIG. 1a.

FIG. 4b shows a close-up view of the inlet device of the centrifugal separator of FIG. 4a.

DETAILED DESCRIPTION OF THE INVENTION

Figure 1A:
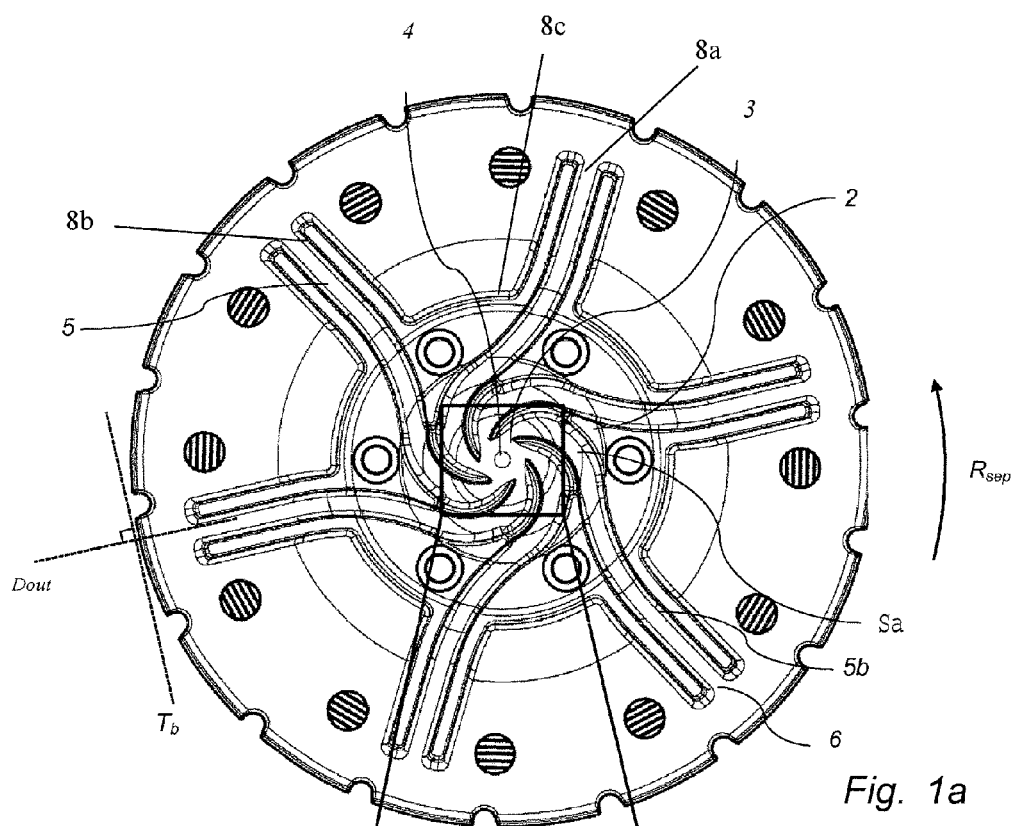
FIG. 1a shows a top view of an inlet device according to an embodiment of the present disclosure.
Figure 1B:
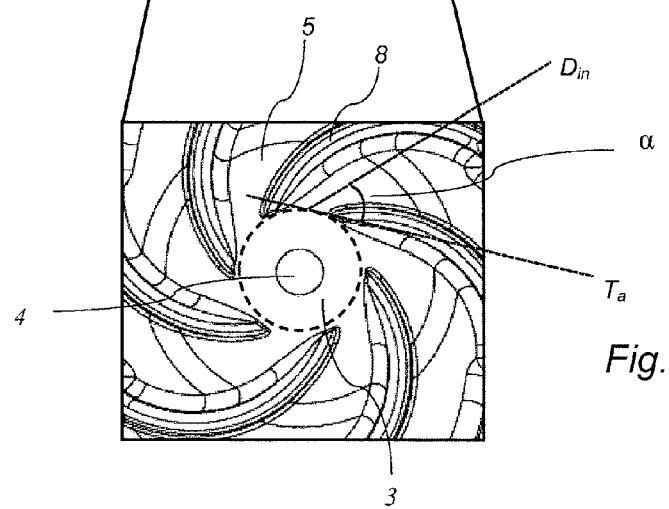
Figure 2:
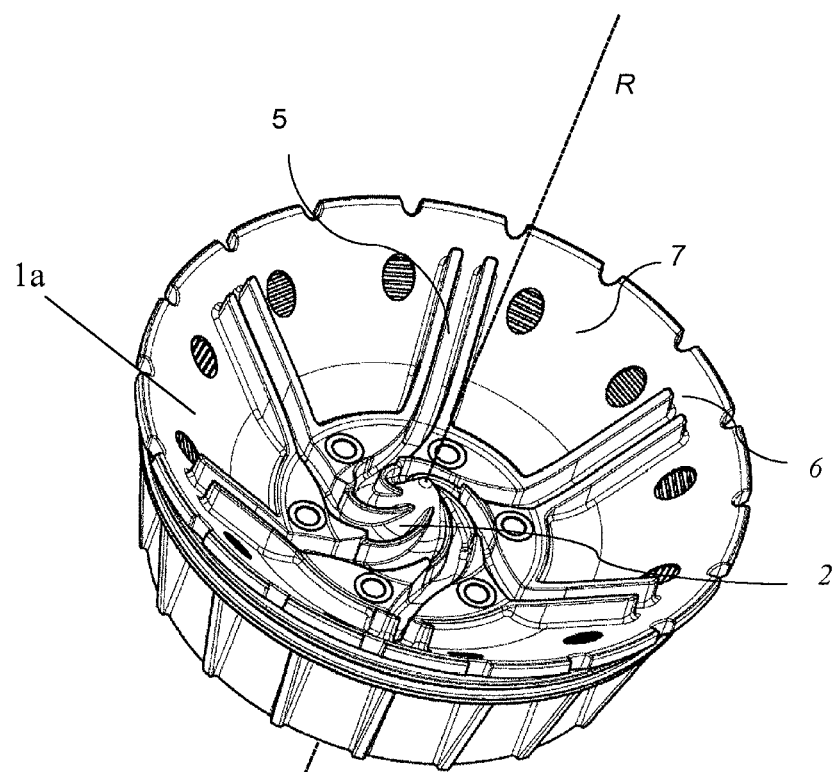
Figure 3:
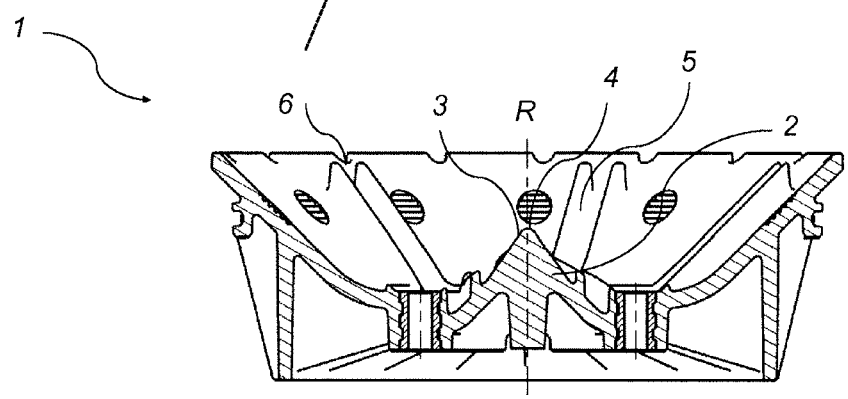

FIGS. 1-3 all show different views of an inlet device 1 according to an embodiment of the present invention. The inlet device 1 is rotatable around central rotational axis R as seen in FIG. 2. The inlet device 1 is shaped as a bowl with a central conical receiving structure 2 extending from the bottom of the bowl. The central conical receiving structure 2 has a rounded top, or apex, 4 and a receiving zone 3 encircles the top 4 of the conical receiving structure 2. Six different inlet channels 5 spirals down the outer sides of the conical receiving structure 2. The rotational direction of the centrifugal separator in which the inlet device 1 is intended to function is indicated by arrow $R_{sep}$ in FIG. 1*a*. $R_{sep}$ is in the counter-clockwise direction when the inlet device is viewed from the top (FIG. 1*a*) whereas the inlet channels 5 makes a twist, or spins, in the clock-wise direction from the top to bottom of the central conical receiving structure 2, i.e. in the opposite direction compared to the rotational direction $R_{sep}$ of the separator.

As seen in FIG. 1*b*, each inlet channel 5 extend from the receiving zone 3 with an angle α, which is the smallest angle formed between the tangent $T_a$ of the periphery of the receiving zone at the extension of the inlet channel 5 and the extension direction $D_{in}$ of the inlet channel 5. In other words, each inlet channel 5 extends with a high angle of incidence. Since the inlet channel extend in a curved direction, $D_{in}$ may be regarded as the tangent to the curve at the start of the inlet channel 5, i.e. at the periphery of the receiving zone 3. In this embodiment, each inlet channel 5 has twisted approximately a quarter of a full turn around the conical receiving structure 2 when reaching the bottom of the conical receiving structure 2.

The inlet channels 5 then continue in a straight radial direction from the bottom of the central conical receiving structure 2, up the inner sides of the bowl and ends in an inlet channel outlet 6. Consequently, each inlet channel is composed of two parts 5*a*, and 5*b*, with different directions. A twisted first part 5*a* that twists down the outer side of the conical receiving structure, and a straight part 5*b*, that extend substantially from the bottom of the central conical receiving structure to the inlet channel outlet 6 that is located near the periphery of the inlet device 1.

Each inlet channel 5 has a substantial constant width throughout the length of the inlet channel, and the sides or projections 8 that form the "walls" of the different channels, i.e. the sides 8 that separates one inlet channel from another, extend upwardly from the surface with a height that is substantially equal to the width of each channel 5. The sides 8 include a first side 8*a* and second side 8*b*. The first side 8*a* and second side 8*b* converge towards one another as they extend radially inwardly and have a first section extending from a periphery of the central conical receiving structure and spiraling outwardly along the outer surface of the central conical receiving structure and a second section extending in a straight radial direction from an outer edge of the central conical receiving structure to an inlet channel outlet. A third side 8*c* extends circumferentially between the first side 8*a* and second side 8*b*. The first side 8 *a* and second side 8*b* extended radially beyond the third side 8*c*. The inlet channels 5 are equally spaced around the conical receiving structure 2 and the inlet channels 5 and sides 8 covers the entire outer area of the conical receiving structure 2.

Since the inlet device is shaped as a concave bowl 1*a*, the part 5*b* of the inlet channel 5 that extends radially up the inner sides of the bowl inclines upwards, as is seen in FIG. 3. In this way, the inlet channel outlet 6 is located at a location that is above the apex 4 of the central conical receiving structure.

When viewed from the top, as in FIG. 1*a*, the inlet device 1 has a substantial circular cross section, and the inlet channel 5 extend at the inlet channel outlet 6 in a direction $D_{out}$ that is substantially perpendicular to the tangent $T_b$ of the periphery of the circular cross section of the inlet device 1.

Figure 4A:
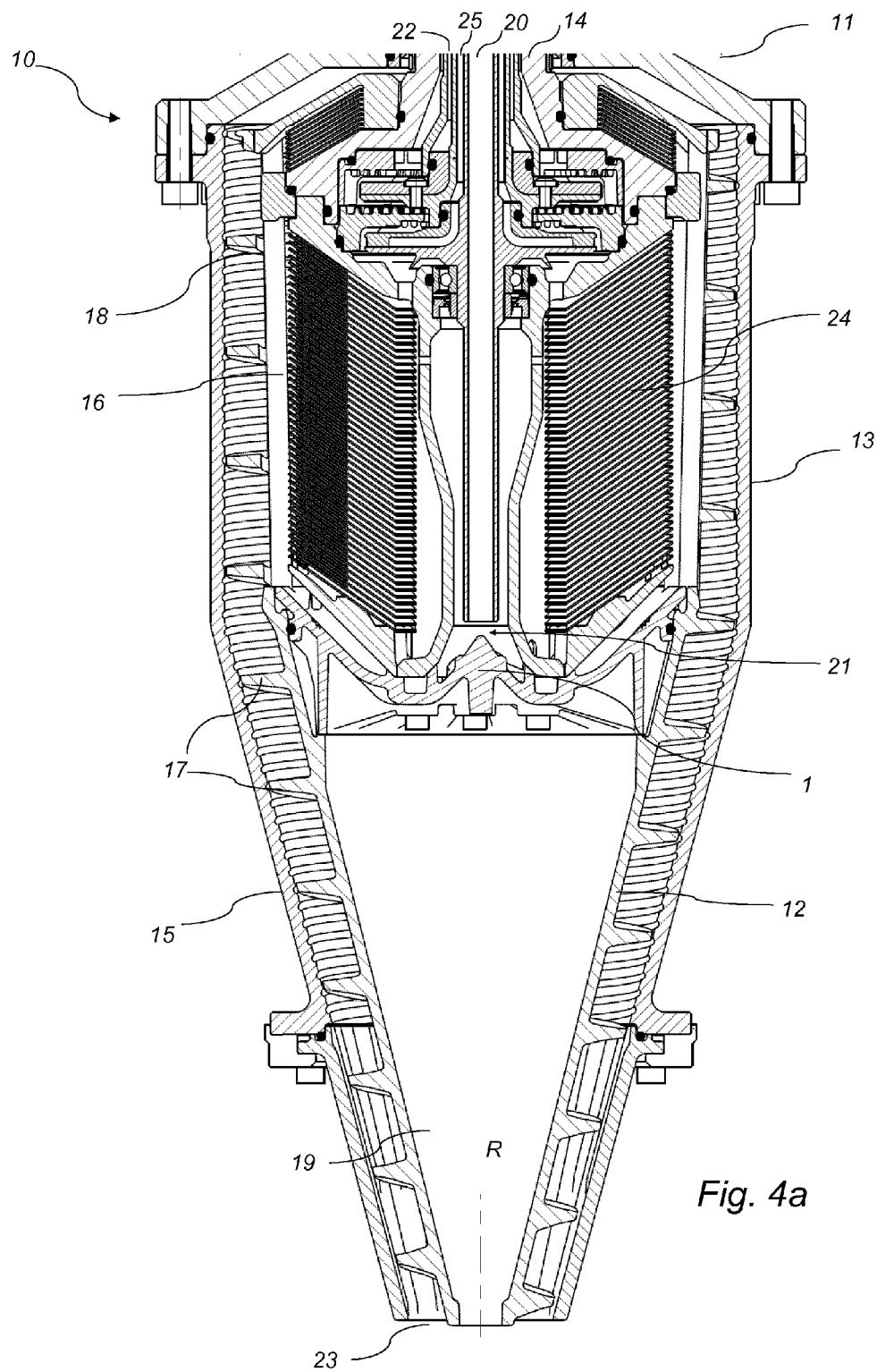
FIG. 4a shows a sectional view of a centrifugal separator according to the present disclosure.

FIG. 4*a* shows a high-speed centrifugal separator 10 having a rotor body 11 which is rotatable around vertical rotational axis R and a screw conveyor 12 which is arranged in the rotor body 11 and rotatable about the same rotational axis R. The screw conveyor 12 may be rotatable around R at a different speed than rotor body 11.

The centrifugal separator 10 is supported vertically by suspension means (not shown). The rotor body has a substantially cylindrical upper portion 13 that comprises or is connected to a hollow rotor shaft 14 and an essentially frustoconical lower portion 15. The inlet device 1 is arranged in the rotor body at the border between cylindrical portion 13 and frustoconical portion 15. The inlet device 1 and the rotor body 11 delimit a separation chamber 16.

The screw conveyor is 12 is drivingly connected to another shaft for rotating the screw conveyor and further comprises at least one conveying thread 17, which extends in a screw-like manner along the whole inside of the rotor body 11 from the upper end of the rotor body to the lower end of the rotor body and is itself connected to a sleeve-formed part 18 of the screw conveyor 12 and to the core 19 of screw conveyor 12. The at least one conveying thread 17 may of course be supplemented by a suitable number of conveying threads, e.g. two, three or four, which all extend in a screw-like manner along the inside of the rotor body 1.

A stationary inlet pipe 20 for supply of a liquid mixture which is to be treated in the rotor body 1 extends around rotational axis R from the upper part of the rotor body to space 21. The inlet pipe 20 discharges axially in a space 21 just above the inlet device 1. The inlet channels 5 of the inlet device thus connect the inlet space 18 with the separation chamber 16.

An outlet channel 22 for the purified liquid, i.e. liquid from which solids have been removed, extends in an outlet pipe 22 which surrounds the inlet pipe 20 and defines a liquid outlet.

A centrally and axially directed outlet 23 for separated particles (sludge) is arranged at the lower end of the rotor body 11 and defines the sludge outlet. In connection with this outlet 23 for sludge, the rotor body 11 may surrounded by a device (not shown) for intercepting sludge which leaves the outlet 23. The rotor body 11 further comprises a stack of truncated conical separation discs 24 which are examples of surface-enlarging inserts. These are fitted coaxially with the rotor body 11 centrally in its cylindrical portion 13. The conical separation discs 24 have their base ends facing away from the sludge outlet 23. Alternatively, the conical separation discs 24 may be oriented such that the base ends face towards the sludge outlet 23.

The rotor body 11 comprises at its upper end at least one outlet 22 for fluid with a higher density than the fluid which has been purified and is led out through the liquid outlet 25. Higher density fluid discharged via the outlet 22 may contain particles which have been separated from the fluid but have not settled out and formed a sludge phase. The higher density fluid may also contain separation aid and/or water.

Figure 4B:
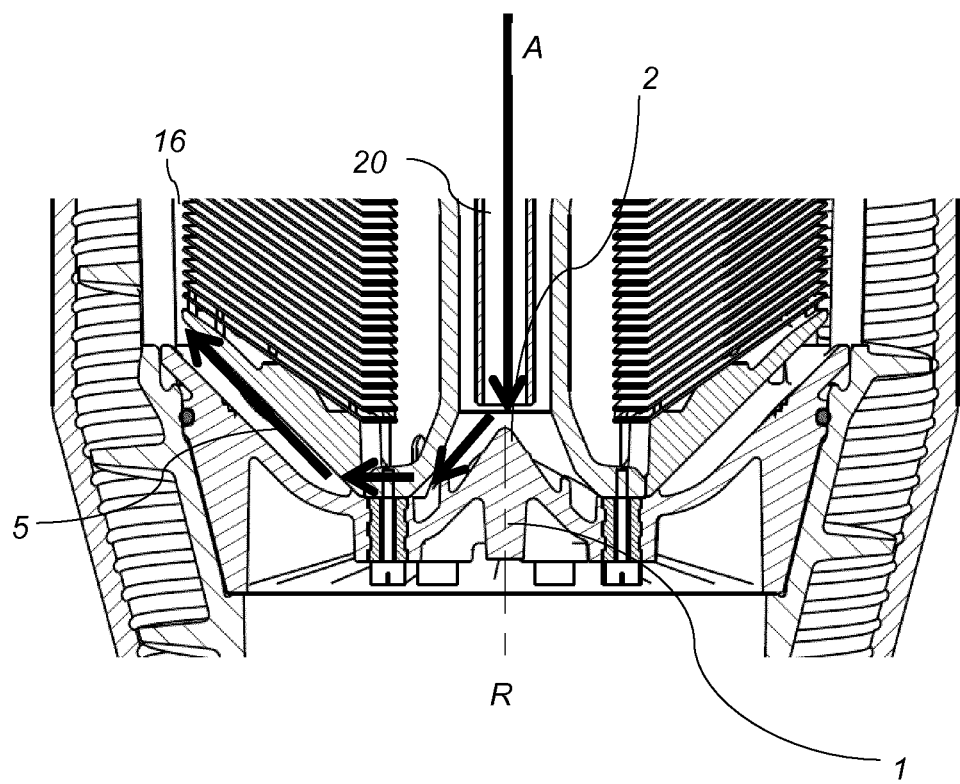

The centrifugal separator described above functions in the following manner during rotation of the rotor body 11 around rotational axis R Separation aid may be added to the contaminated fluid before it enters the centrifugal separator. The mixture of fluid to be purified and separation aid is fed into the centrifugal separator, when the latter has been caused to rotate, via the stationary inlet 25 to the inlet device 1, which smoothly accelerates and puts the mixture into rotation and distributes the liquid, via inlet channels 5, to the separation chamber 16. This is illustrated in FIG. 4b. The liquid mixture is in the separation chamber 16 subjected to a centrifugal force, and by further aid of separation discs 24, solids in the liquid mixture are projected radially outwards. Particles separated from the liquid and sludge formed at the periphery of the rotor body is then fed by the screw conveyor 13 axially towards the conical portion 12 of the rotor body 11 and proceed out through the sludge outlet 23. Purified liquid passes on radially inwards and is extracted via the liquid outlets 22 and 25. In this way, liquid outlet 22 may be for extracting an aqueous phase and liquid outlet 25 may be for extracting an oil phase.

While the invention has been illustrated and described in detail in the drawings and foregoing description, such illustration is and description are to be considered illustrative or exemplary and not restrictive; the disclosed invention is not limited to the disclosed embodiments.

As an example, the invention is not limited to the orientation of the axis of rotation R disclosed in the figures. The term "centrifugal separator" also comprises centrifugal separators with a substantially horizontally oriented axis of rotation. According to the embodiments disclosed in FIGS. 4a and 4b, the centrifugal separator is supported its one end, i.e. the upper end. Centrifugal separators of this kind may also be supported at the sludge outlet 23 for separated particles.

Furthermore, the term "comprising" does not exclude other elements or steps and any reference signs in the claims should not be construed as limiting the scope.

The invention claimed is:

1. An inlet device for a centrifugal separator for directing a liquid mixture that is to be separated from an inlet pipe to a separation chamber, wherein said inlet device is rotatable around a central rotational axis, the inlet device comprising:
   a body;
   a central conical receiving structure at a center of the body, the central conical receiving structure comprising an outer surface, an outer edge and a central receiving zone for receiving said liquid mixture from the inlet pipe and wherein said central receiving zone surrounds an apex of said central conical receiving structure; and
   at least one inlet channel for directing said liquid mixture from said central receiving zone to said separation chamber, wherein said at least one inlet channel is formed by two opposed sidewalls, the two sidewalls having a first section extending from a periphery of the central conical receiving structure and spiralling outwardly along the outer surface of said central conical receiving structure and a second section extending in a straight radial direction from the outer edge of the central conical receiving structure to an inlet channel outlet,
   wherein said at least one inlet channel extends from the central receiving zone in a direction that forms an angle α with a tangent of a periphery of the central receiving zone and wherein the angle α is less than 90°, and
   wherein said inlet channel outlet is configured to be in contact with the separation chamber of the centrifugal separator.

2. The inlet device according to claim 1, wherein the angle α is less than 45°.

3. The inlet device according to claim 2, wherein said at least one inlet channel spirals clockwise from the central receiving zone down the outer surface of the central conical receiving structure if the inlet device is for rotation in an anti-clockwise direction around the rotational axis and vice versa.

4. The inlet device according to claim 1, wherein the apex of said central conical receiving structure is rounded.

5. The inlet device according to claim 4, wherein said at least one inlet channel spirals clockwise from the central receiving zone down the outer surface of the central conical receiving structure if the inlet device is for rotation in an anti-clockwise direction around the rotational axis and vice versa.

6. The inlet device according to claim 1, wherein said at least one inlet channel spirals clockwise from the central receiving zone down the outer surface of the central conical receiving structure if the inlet device is for rotation in an anti-clockwise direction around the rotational axis and vice versa.

7. The inlet device according to claim 1, wherein said inlet device comprises PEEK (polyether ether ketone).

8. The inlet device according to claim 1, wherein the body has a substantially circular cross section, and
   wherein said at least one inlet channel is located at the inlet channel outlet in a direction that is substantially perpendicular to a tangent of a periphery of said circular cross section.

9. The inlet device according to claim 8, wherein the body has a bowl shape in which said central conical receiving structure is located in a center of the body and extending from a bottom of said bowl shape, and wherein the two sidewalls extend up inner sides of the bowl shape.

10. The inlet device according to claim 8, wherein said inlet channel outlet is arranged at a position that is above the apex of the central conical receiving structure along the rotational axis.

11. A centrifugal separator for separating solids from a liquid mixture, comprising:
    a rotor body which is rotatable around a central axis of rotation and comprising a separation chamber;
    an inlet pipe for supplying liquid mixture that is to be separated;
    at least one liquid outlet for discharge of separated liquid from the liquid mixture;
    at least one sludge outlet for separated solids;
    a screw conveyor adapted to rotate in the rotor body around the axis of rotation for transporting the separated solids in the separation chamber towards and out of the sludge outlet; and
    the inlet device according to claim 1 centered around the central axis of rotation and for directing supplied liquid mixture from said inlet pipe to said separation chamber.

12. The centrifugal separator according to claim 11, wherein the inlet device is configured to rotate with the rotor body.

13. The centrifugal separator according to claim 11, wherein the rotor body is rotatably supported only at one end thereof through a rotor shaft, which is arranged so that the central axis of rotation extends substantially vertically.

14. The centrifugal separator according to claim 11, wherein the rotor body includes a stack of truncated conical separation discs in the separation chamber.

15. The centrifugal separator according to claim 11, wherein the inlet pipe extends into the rotor body at a first end of the rotor body, said liquid outlet includes at least one outlet channel, which extends out of the rotor body at said first end, and the sludge outlet for separated solids is arranged at an end opposite said first end of the rotor body.

16. The centrifugal separator according to claim 11, wherein the at least one liquid outlet for discharge of separated liquid from the liquid mixture comprises an outlet for a liquid of a first density and an outlet for a liquid of a density that is higher than the first density.

17. The inlet device according to claim 1, wherein the at least one inlet channel is a plurality of channels,
   wherein the walls of the plurality of channels are defined by projections, and
   wherein sides of the projections form sidewalls for adjacent channels.

18. The inlet device according to claim 17, wherein the plurality of channels are evenly spaced about the central receiving zone.

19. The inlet device according to claim 1, wherein the body is concave.

20. An inlet device for a centrifugal separator for directing a liquid mixture that is to be separated from an inlet pipe to a separation chamber, wherein said inlet device is rotatable around a central rotational axis and comprises:
   a central conical receiving structure arranged around said central rotational axis and comprising a central receiving zone for receiving said liquid mixture from the inlet pipe and wherein said central receiving zone surrounds an apex of said central conical receiving structure; and
   at least one inlet channel for directing said liquid mixture from said central receiving zone to said separation chamber, wherein said at least one inlet channel is formed by two opposed sidewalls, the two sidewalls extends from a periphery of the central receiving zone and spirals down an outer surface of said central conical receiving structure,
   wherein said at least one inlet channel extends from the central receiving zone in a direction that forms an angle $\alpha$ with a tangent of a periphery of the central receiving zone and wherein the angle $\alpha$ is less than 90°,
   wherein said at least one inlet channel further extends in a straight radial direction from the central rotational axis from a bottom of the central conical receiving structure to an inlet channel outlet,
   wherein said inlet channel outlet is configured to be in contact with the separation chamber of the centrifugal separator, and
   wherein a width of said at least one inlet channel is substantially constant throughout a length of said at least one inlet channel.

* * * * *